United States Patent
Abedini et al.

(10) Patent No.: US 12,324,036 B2
(45) Date of Patent: Jun. 3, 2025

(54) LINK ESTABLISHMENT VIA AN ASSISTING NODE

(71) Applicant: QUALCOMM Incorporated, San Diego, CA (US)

(72) Inventors: Navid Abedini, Basking Ridge, NJ (US); Sourjya Dutta, San Diego, CA (US); Kapil Gulati, Belle Mead, NJ (US); Naeem Akl, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 17/815,863

(22) Filed: Jul. 28, 2022

(65) Prior Publication Data
US 2024/0040640 A1    Feb. 1, 2024

(51) Int. Cl.
*H04W 76/19* (2018.01)
*H04W 72/20* (2023.01)
*H04W 76/14* (2018.01)

(52) U.S. Cl.
CPC ........... *H04W 76/14* (2018.02); *H04W 72/20* (2023.01)

(58) Field of Classification Search
CPC .............................. H04W 76/14; H04W 72/20
See application file for complete search history.

(56) References Cited

U.S. PATENT DOCUMENTS

| | | | |
|---|---|---|---|
| 11,864,038 B2* | 1/2024 | Ingale | H04L 5/0053 |
| 2020/0413306 A1* | 12/2020 | Decarreau | H04B 7/0695 |
| 2022/0038934 A1* | 2/2022 | Kumar | H04W 24/10 |
| 2022/0225184 A1* | 7/2022 | Dalsgaard | H04W 36/322 |
| 2023/0115368 A1* | 4/2023 | Parichehrehteroujeni | H04W 12/60 706/46 |
| 2023/0217291 A1* | 7/2023 | Teyeb | H04W 24/10 370/241 |

FOREIGN PATENT DOCUMENTS

WO    WO-2022153953 A1 *   7/2022   ........... H04B 17/336

OTHER PUBLICATIONS

3GPP TSG RAN WG2 Meeting #69, R2-101009 Title:LS response on assistance information for OTDOA positioning support for LTE-remaining issues (Year: 2010).*

* cited by examiner

*Primary Examiner* — Faruk Hamza
*Assistant Examiner* — Abusayeed M Haque
(74) *Attorney, Agent, or Firm* — Patterson + Sheridan, L.L.P.

(57) ABSTRACT

Certain aspects of the present disclosure provide a method of wireless communications by a user equipment (UE) generally including receiving cell association information from at least one assisting node and establishing a connection with a network entity of at least one cell via the at least one assisting node, based on the cell association information.

27 Claims, 15 Drawing Sheets

LINK ESTABLISHMENT VIA AN ASSISTING NODE

BACKGROUND

Field of the Disclosure

Aspects of the present disclosure relate to wireless communications, and more particularly, to techniques for establishing a link between a user equipment (UE) and a network entity via an assisting node.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving cell association information from at least one assisting node; and establishing a connection with a network entity of at least one cell via the at least one assisting node, based on the cell association information.

Another aspect provides a method of wireless communications by an assisting node. The method includes transmitting, to a UE, cell association information; and assisting the UE establish a connection with a network entity of at least one cell, based on the cell association information.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for establishing a link between a user equipment (UE) and a network entity via an assisting node.

Various types of devices may be deployed in a wireless network to assist other devices, such as user equipments (UEs), gain coverage and capacity. For example, assisting nodes may help UEs establish and maintain links with network entities, such as base stations (e.g., gNBs). Examples of assisting nodes include repeaters, reflectors, and certain types of relatively simple physical layer (Layer 1 or L1) relays. One example use case is a mobile repeater that assists in-vehicle UEs to establish a more reliable and higher-capacity link to the network (outside cells). Another example use case is a repeater deployed in an indoor environment and/or deployed to provide outside to inside (out-2-in) coverage extension for UEs inside a building.

In such scenarios, a UE may detect an assisting node and, after detection, communicate with the assisting node, for example, via sidelink, WiFi, Bluetooth, or any other interface. Once the UE has established communication with the assisting node, the assisting node can forward cellular link (Uu) signals between the network entity (e.g., gNB) and the UE.

In some cases, it may be assumed that the network is aware of an assisting node (e.g., the assisting node is not transparent to the network). It may also be assumed that the assisting node is primarily or at least partially] controlled by the UE. Even in such scenarios, one potential challenge is how the UE finds a path (e.g., a suitable beam and/or cell) via the assisting node to the network.

Aspects of the present disclosure, however, provide mechanisms that might help a UE find a network path faster, based on cell association information received from an assisting node. Using the cell association information, a UE may be able to establish a network link faster and also maintain the link to gain needed capacity. As a result, the assisted link establishment mechanisms proposed herein may help improve overall performance and user experience.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
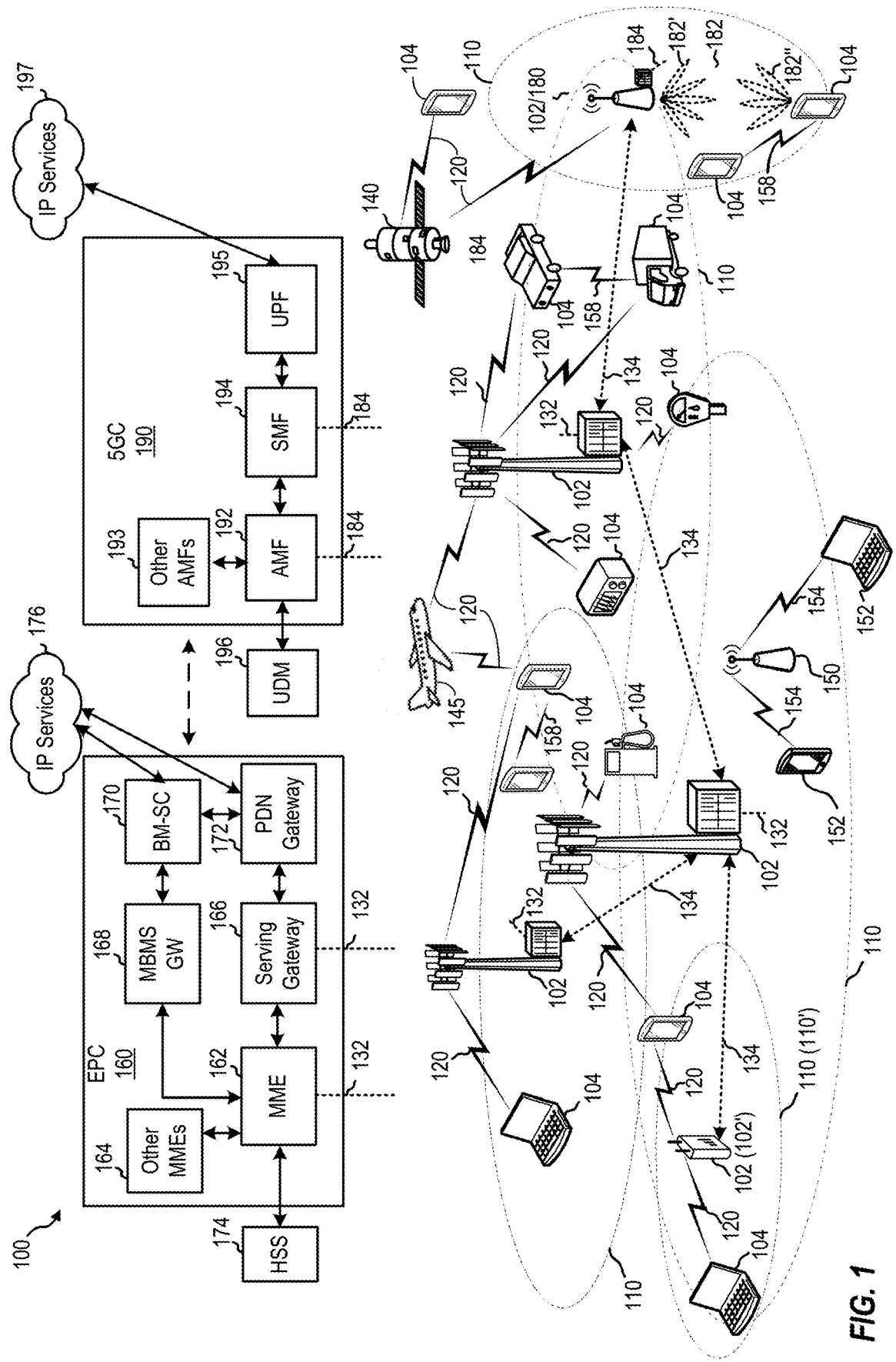
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
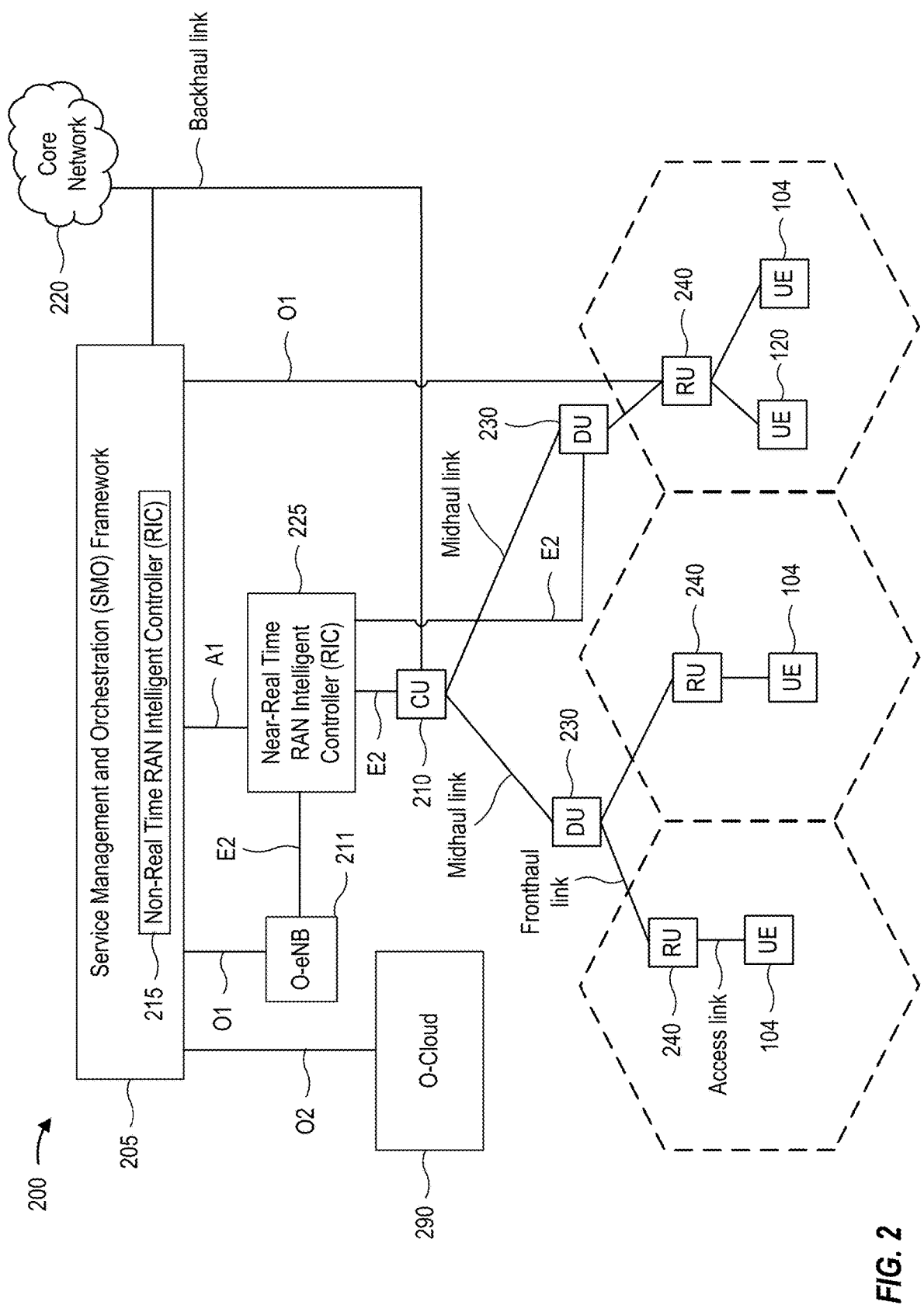
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT MC 215 or the Near-RT MC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
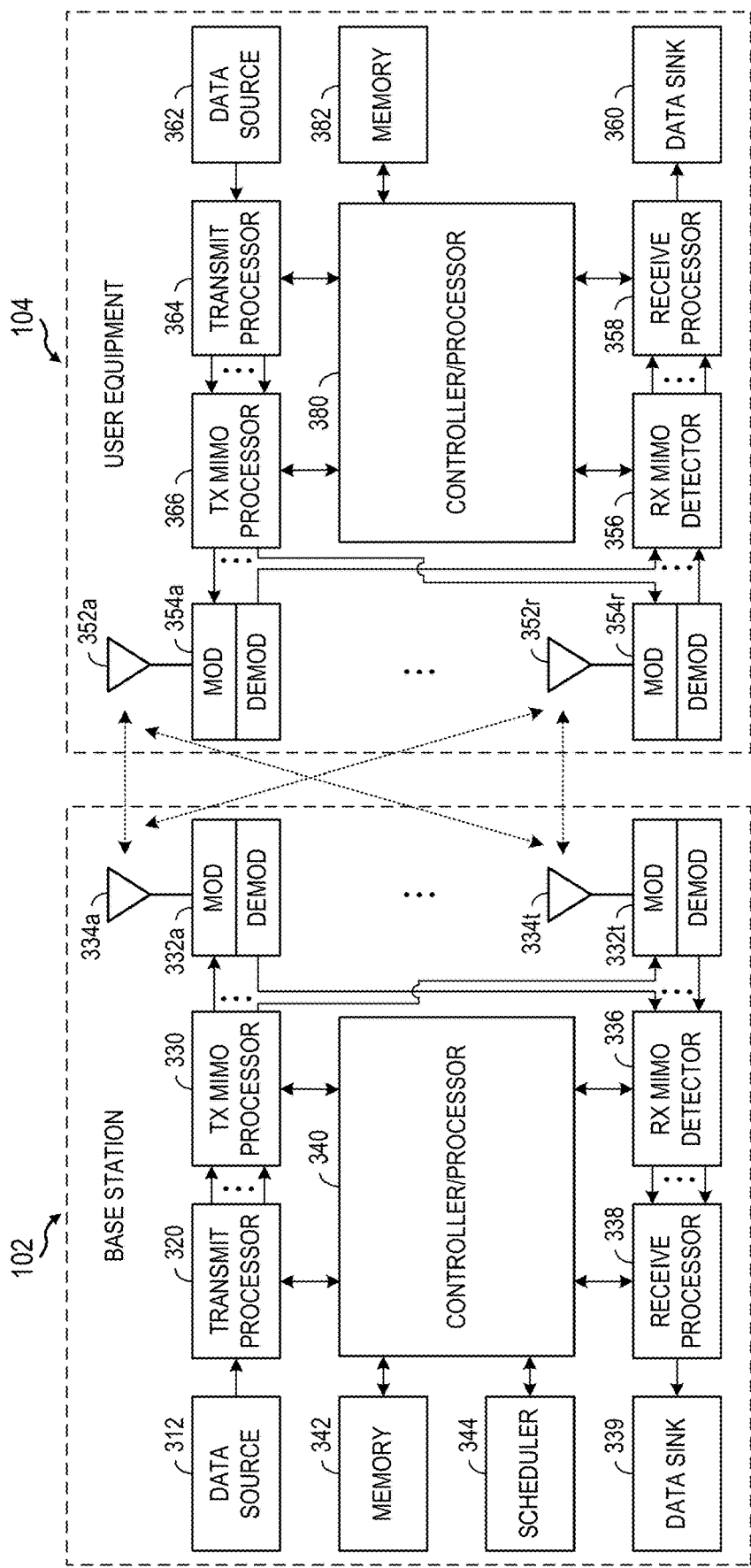
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
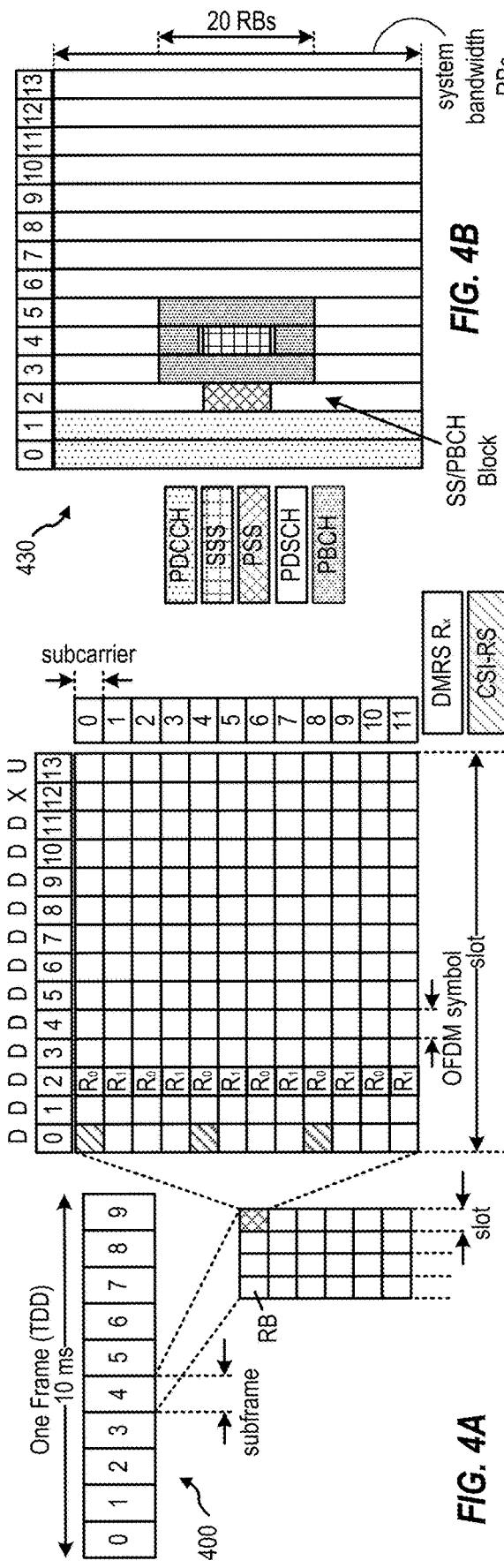
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Assisting Nodes

Figure 5:
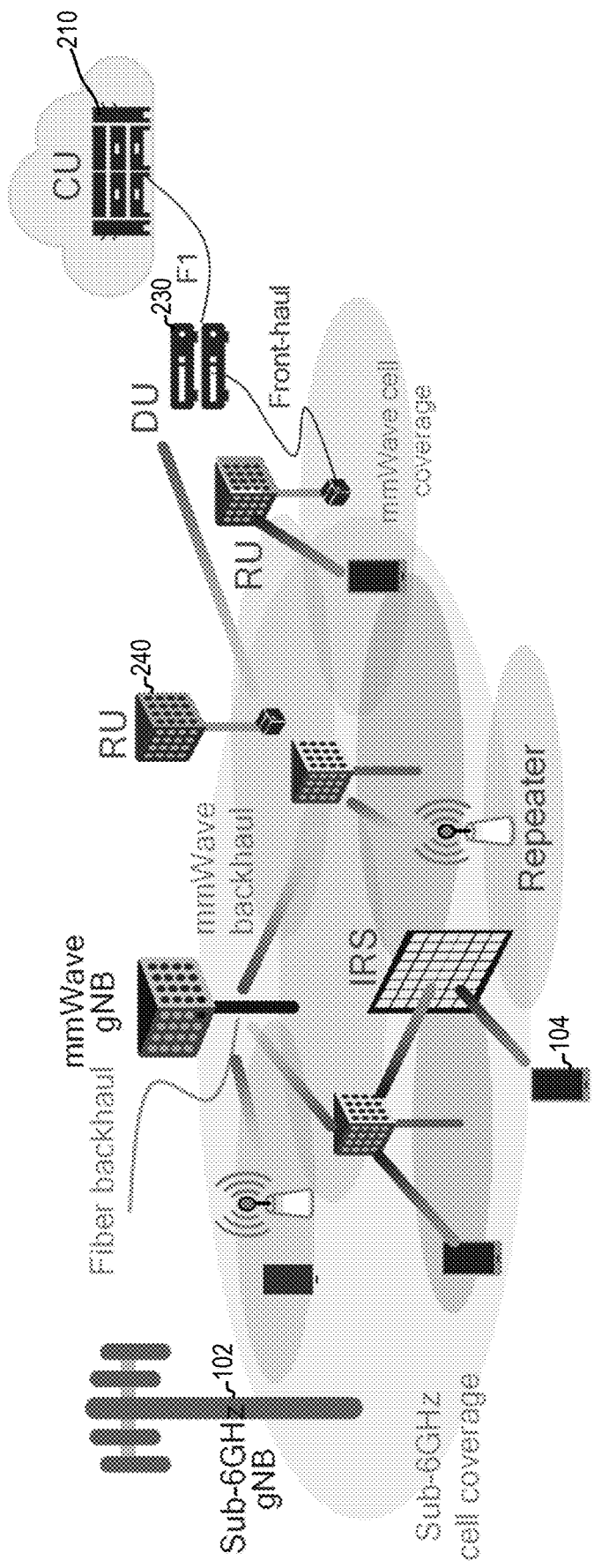
FIG. 5 depicts an example network with assisting nodes.

As illustrated in FIG. 5, various types of devices may be deployed in a (relatively dense) wireless network to assist other devices, such as UEs 104, to gain reliable coverage and required capacity. For example, assisting nodes may help UEs establish and maintain links with network entities, such as base stations (e.g., gNBs 102) or nodes of a disaggregated base station, such as CU 210 and DU 230. In some cases, (wired or wireless) fronthaul links may be established between DUs and RUs 240, while wired (e.g., fiber) or wireless (e.g., mmWave) backhaul links may connect RAN nodes to the core network.

Examples of assisting nodes include repeaters (e.g., smart repeaters), lower-layer (L1/L2) relays (wireless RUs/TRPs), IAB nodes, or reflectors, such as intelligent reflecting surfaces (IRSs, also referred to as reconfigurable intelligent surfaces-RIS). As in the illustrated example, assisting nodes may be used to extend the coverage of DU cells. In some cases, a UE that is already connected to a cell may use a repeater to improve the connection (e.g., through an alternative path or additional path).

Some types of assisting nodes typically have little (very limited) or no scheduling capability or medium access control (MAC) functionality. Assisting nodes typically carry the same physical cell IDs (PCIDs) as corresponding donor cells (e.g., so called because they may donate resources to be used by the assisting nodes).

Figure 6A:
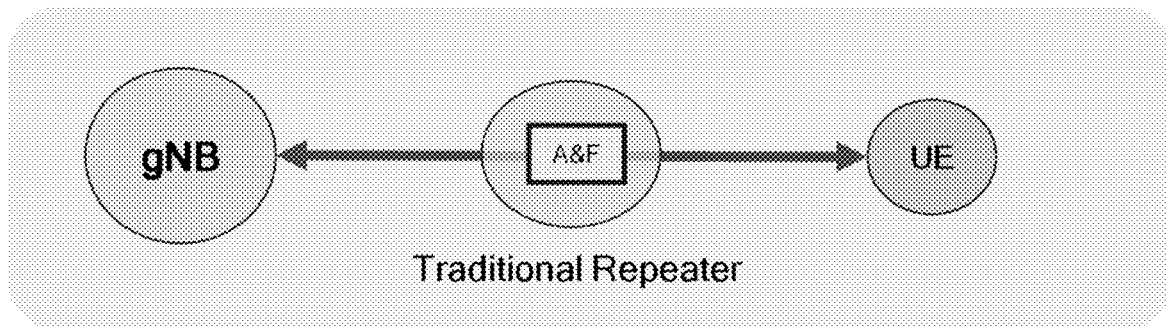
FIGS. 6A-6C depict example repeater scenarios.
Figure 6B:
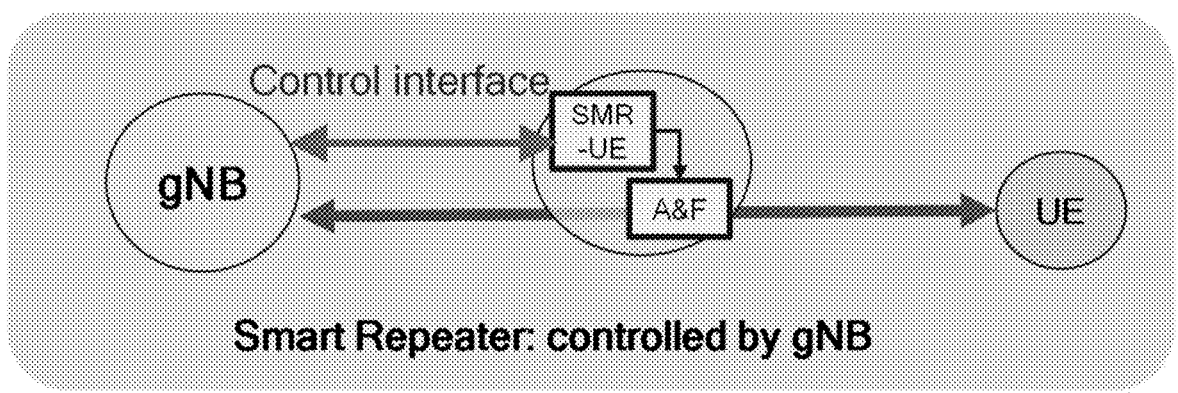
Figure 6C:
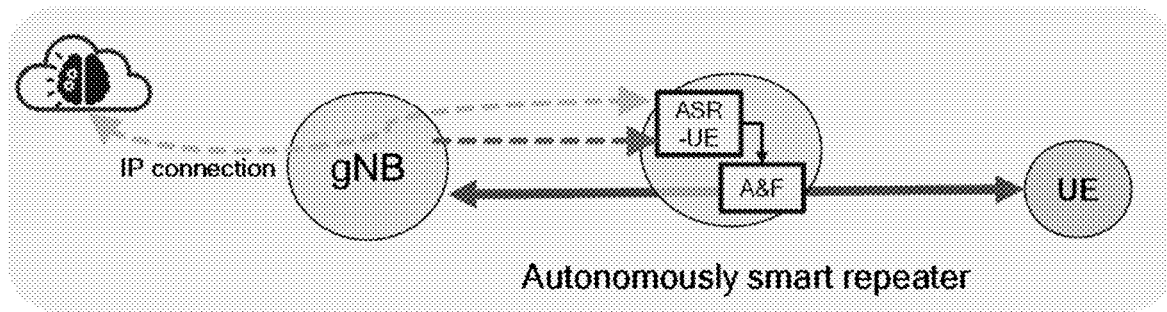

FIGS. 6A-6C depict examples of various types of repeaters with different forms of control. As illustrated in FIG. 6A, a traditional repeater may have little or no control functionality, little or no intelligence, and little or no configurability. Such repeaters may thus be limited to amplifying and forwarding (A&F) signals between the network and UE.

As illustrated in FIG. 6B, a smart repeater may include a control interface (a smart repeater to UE or SMR-UE interface), allowing for network control. As illustrated in FIG. 6C, an autonomous smart repeater may include an control interface (an autonomous smart repeater to UE or ASR-UE interface) that allows for establishment of a IP connection.

Figure 7A:
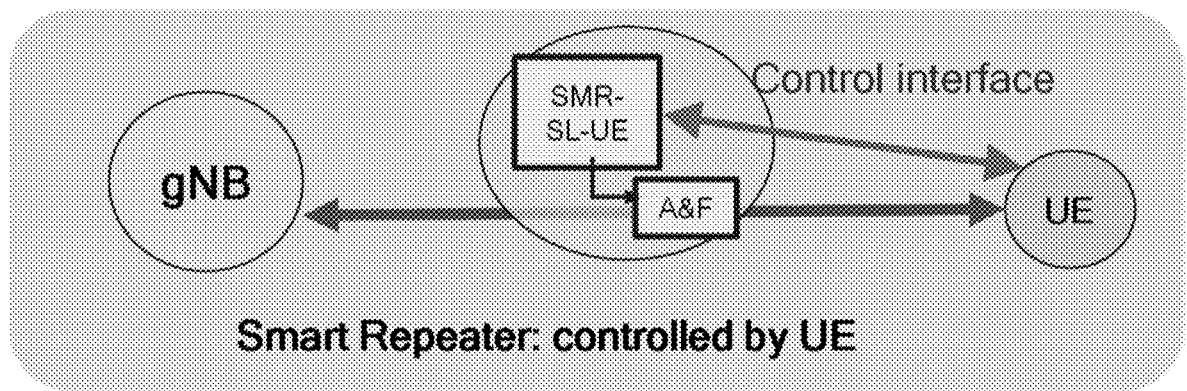
FIGS. 7A-7B depict example repeater control schemes.
Figure 7B:
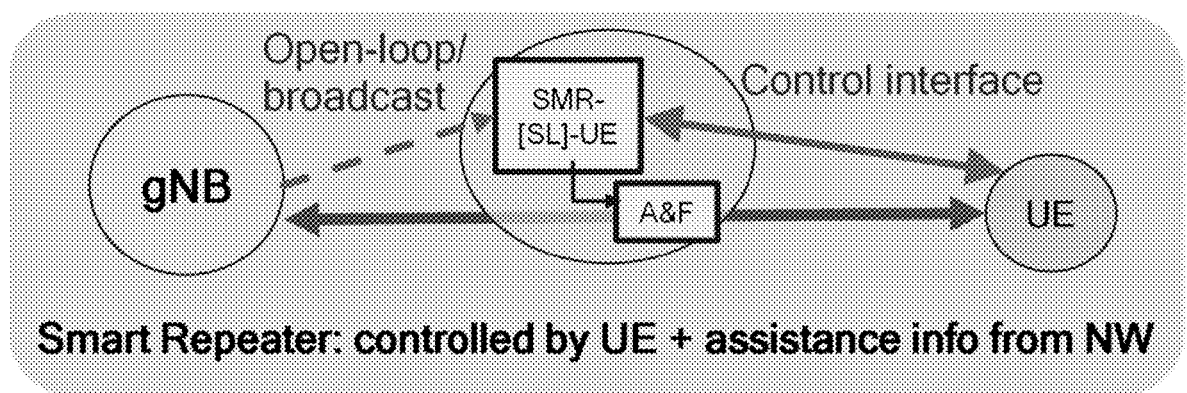

Some repeaters may also be controlled at least partially by a UE. For example, as illustrated in FIG. 7A, a smart repeater may include a control interface (an SMR-SL-UE) allowing for UE control via a local (e.g., SL) interface. As illustrated in FIG. 7C, some smart repeaters may be primarily controlled by a UE, but with some assistance information from the network.

Figure 8A:
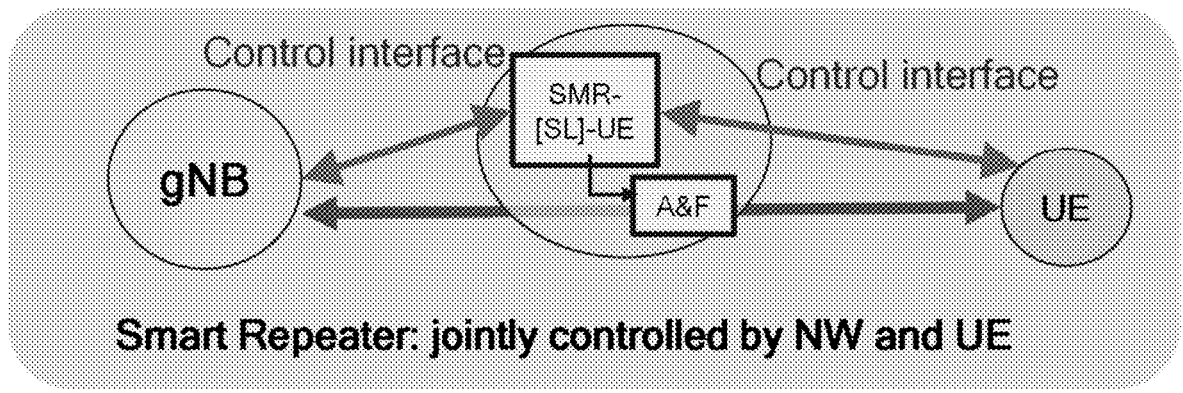
FIGS. 8A-8B depict example repeater joint control schemes.
Figure 8B:
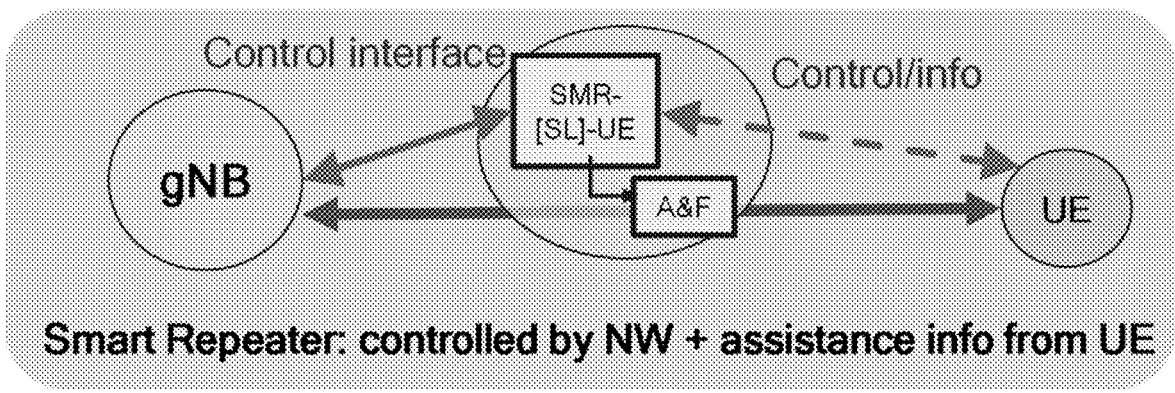

Some repeaters may be controlled jointly by the network and a UE. For example, as illustrated in FIG. 8A, a smart repeater may include a control interface allowing the smart repeater to be controlled by both the network (e.g., via a Uu interface) and the UE (e.g., via a SL interface). As illustrated in FIG. 7C, some smart repeaters may be primarily controlled by the network, but with some assistance information from the UE.

As described above, if a repeater is deployed by a UE, it may be controlled at least partially by the UE. If the repeater has a long time association with one or multiple UEs, some of the control and local management aspects can be off-loaded from the network to the UE(s). For UE-controlled repeater scenarios, a UE may perform a procedure to discover repeaters. As part of this procedure, the UE and repeater may exchange some capability and configuration information. Once discovered, with the UE (at least partially) controlling the UE, information be exchanged regarding a fronthaul (FH) beam, service-side beam, timing, time division duplexing (TDD) modes, power control, bandwidth (BW), and ON-OFF low power states.

Aspects Related to Link Establishment Via an Assisting Node

Aspects of the present disclosure, however, provide mechanisms that might help a UE find a network path faster, based on cell association information received from an assisting node. Using the cell association information, a UE may be able to establish a network link faster and also maintain the link to gain needed capacity. As a result, the assisted link establishment mechanisms proposed herein may help improve overall performance and user experience.

There are various use cases for the various types of repeaters. One example use case for repeaters is a mobile repeater that assists in-vehicle UEs (V-UEs) to establish a more reliable and higher-capacity link to the network (outside cells). Another example use case is a repeater deployed in an indoor environment and/or deployed to provide outside to inside (out-2-in) coverage extension for UEs inside a building.

In such scenarios, a UE may detect an assisting node and, after detection, communicate with the assisting node, for example, via sidelink, WiFi, Bluetooth, or any other interface. Once the UE has established communication with the assisting node, the assisting node can forward cellular link (Uu) signals between the network entity (e.g., gNB) and the UE.

In some cases, it may be assumed that the network is aware of an assisting node (e.g., the assisting node is not transparent to the network). It may also be assumed that the assisting node is primarily or at least partially controlled by the UE.

In such scenarios, one potential challenge is how the UE finds a path (e.g., a suitable beam and/or cell) via the assisting node to establish a link to the network.

Figure 9:
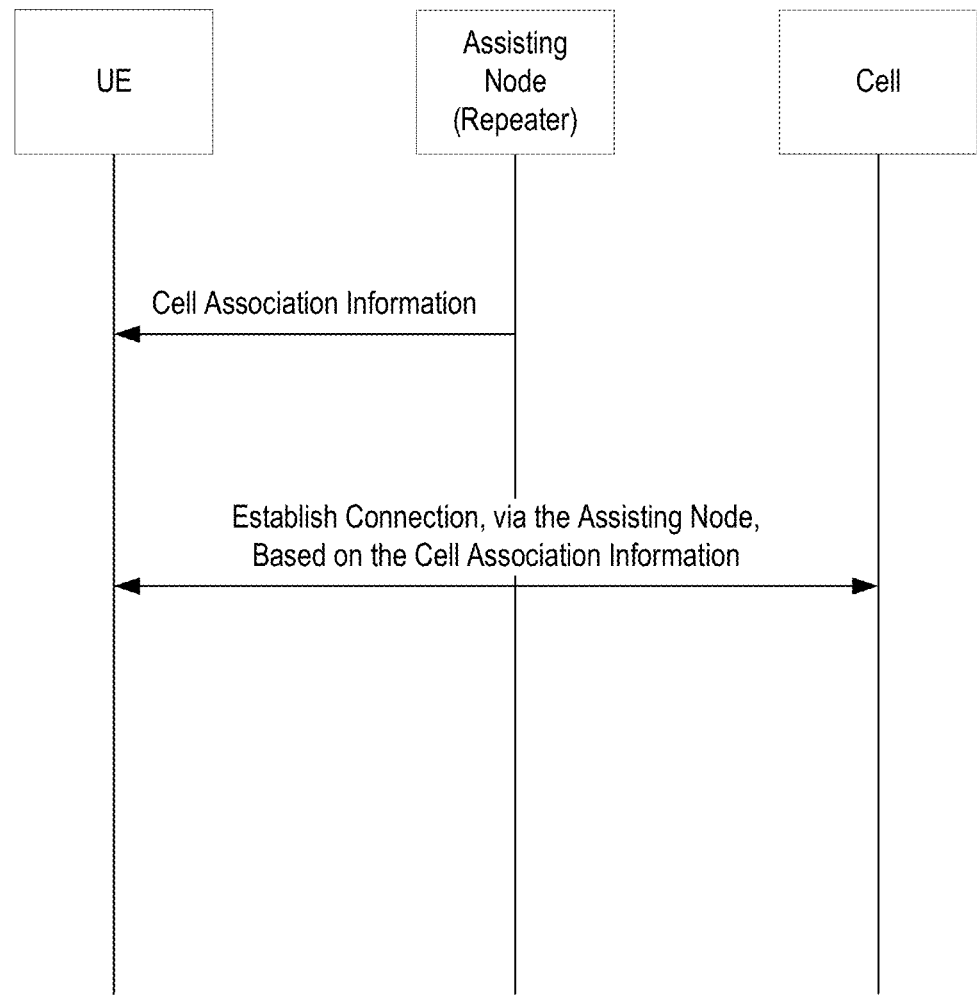
FIG. 9 depicts a high level call flow diagram for establishing a link via an assisting node, in accordance with aspects of the present disclosure.

Techniques presented herein for link establishment via an assisting node may be understood with reference to the call flow diagram 900 of FIG. 9. While the assisting node may be any of the types of assisting nodes described above, in some cases, for ease of reference, an assisting node may be referred to simply as a repeater.

As illustrated, a UE may receive cell association information from at least one assisting node. The UE may then establish a connection with a network entity of at least one cell via the at least one assisting node, based on the cell association information.

The cell association information may be received over a local interface (e.g., SL) and may include various types of information to help a UE establish a link with one or more cells. For example, the cell association information may indicate one or more cell to which the repeater is currently connected to or is camping on, synchronization signal block (SSB) beam indices for that cell, a quality of a (fronthaul) link between the assisting node and a cell. The link quality may be in terms of SSB reference signal received power (SSB-RSRP) or CSI-RS RSRP.

In some cases, the cell association may include a list of one or more neighbor cells detected by the assisting node, along with beam (e.g., SSB) and quality information, as well as other information (e.g., how long the assisting node has stayed or camped on any of the cells.

In some cases, the assisting node may broadcast this information (or at least part of this info such as list of associated cells). In some cases, the assisting node may share this info upon request from the UE or after connecting to the UE.

There are various scenarios that may determine exactly how a UE receives and uses assistance information to establish or improve a connection to the network.

In a first scenario, a UE may be already connected to a cell (e.g., cell X) via a beam i (e.g., SSB i). In such cases, the UE may connect to the same cell X, via the assisting node using a different beam j (e.g., SSB j). In this case, the serving beam of the UE will be changed (from i to j).

In a second scenario, the UE may be already connected to cell X and, via the assisting node, the UE can connect to a different cell Y. In this case, the serving cell of UE may be changed (e.g., via a handover from cell X to cell Y). Alternatively, cell Y can be added to the list of the UE's serving cells (e.g., as a new secondary cell, or via dual connectivity-DC). In a third scenario, the UE (and/or assisting node) may not be connected at all (e.g., before/during initial access or if the UE is in an idle or inactive state).

Figure 10:
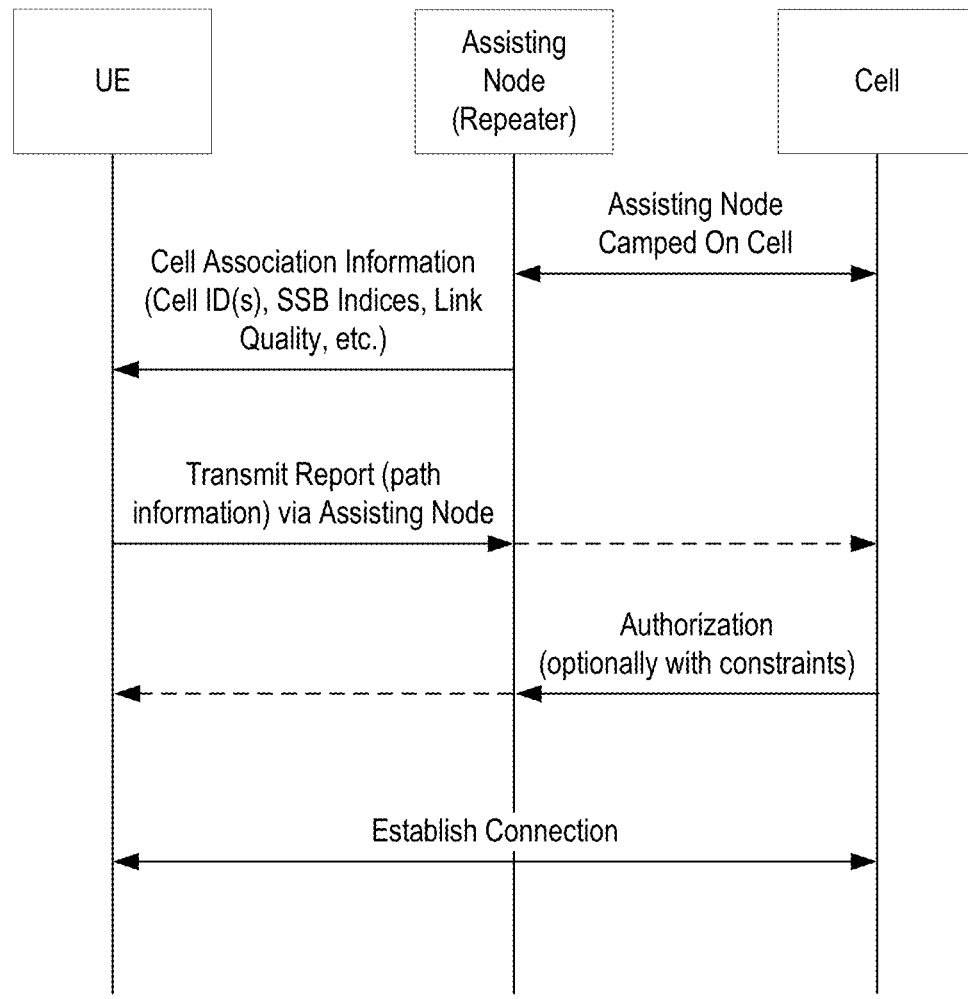
FIG. 10 depicts a more detailed call flow diagram for establishing a link via an assisting node, in accordance with aspects of the present disclosure.

As illustrated in FIG. 10, upon receiving the cell association information from the assisting node, the UE may decide to use the assisting node to reach to the NW (via a cell network entity). In such cases, the UE may transmit a report with information regarding a path to the network entity via the assisting node.

In some cases, the UE may use existing type reporting procedures (e.g., for beam, link, or radio resource management RRM) to start reporting information regarding the alternative path (beam/cell) to the cell that it can effectively see via the assisting node.

In the first scenario described above (e.g., if the assisting node and UE are connected to the same cell X), the UE may add to or update its beam report the SSB beam j that can be seen via the assisting node. In these cases, the UE may calculate the end-to-end quality metric (e.g., RSRP) based on what is reported by the assisting node (e.g., RSRP between the assisting node and the cell) and its own local measurement of the link between the assisting node and itself, as well as other information about the assisting node (e.g., its amplification gain level). In some cases, the UE may coordinate with the assisting node to perform end-to-end measurements.

In case, beam j cannot be reported (e.g., if not part of the report configuration), the UE may indicate beam j to the network as a new beam candidate, for example, via a beam failure recovery (BFR) procedure.

In the second scenario described above (e.g., if the assisting node is connected to a different cell Y), the UE may add to or update its RRM measurement report with cell Y measurement (and the associated SSB) that can be seen via the assisting node. Again, the UE may calculate the end-to-end quality metric based on what is reported by the assisting node and its own local measurement of the link between the assisting node and itself, as well as other information about the assisting node.

In the third scenario described above, in case the UE (and/or assisting node) is note connected, the UE may follow a conventional approach for cell reselection and camp on a new cell seen via the assisting node.

In some cases, the UE may additionally (or alternatively) indicate to the network that the new/updated reports are associated with an end-to-end (E2E) link seen via an assisting node. In some cases, this indication may be carried as an ID of the assisting node. In some cases, the UE may indicate to the network the ID of a detected/selected assisting node (e.g., without transmitting measurement reports). This approach may be used in any of the three scenarios. For example, in the third scenario, after connecting to the network, the UE may notify the network (e.g., during a random access channel-RACH-procedure or at a later stage) that its connection is via an assisting node. In some cases, the UE may additionally/alternatively send an indication to the assisting node to notify the network of its decision/desire to use the assisting node.

As illustrated in the call flow diagram 1000 of FIG. 10, in some cases, the network may authorize the UE to use the assisting node (e.g., based on the report from the UE). In some cases, the UE may only establish a connection with the network via the assisting node after receiving such authorization.

In some cases, the network may implicitly authorize the UE to use the assisting node. For example, implicit authorization may be indicated by changing the serving beam (and/or cell) or adding a new cell for which the signals will be forwarded by the assisting node.

In other cases, the network may explicitly feedback to UE and/or to the assisting node indicating whether it authorizes the assisting node to UE (R-UE) association. In some cases, the network may include a cause value (e.g., over-loaded, high interference, power saving) if the association is not authorized. In some cases, even though authorized, the network may provide some constraints (e.g., conditions/limitations) for such an association. For example, the network may indicate allocated resources/spatial directions, an allowed duration, a (maximum) power configuration, communication direction (DL/UL), Tx/Rx timing reference, and the like.

In some cases, upon receiving a request from a UE to use an assisting node, the assisting node may indicate to the network various information it has received from the UE. In some case, the assisting node may be configured with semi-static (e.g., configured grant CG) resources to send the indication. In case the assisting node does not have resources to send the notification, it may first send a scheduling request (SR), so that it may be provided with UL resources.

In some cases, upon receiving a request from the UE, the assisting node may send feedback directly to UE. For example, this feedback may indicate whether the UE can use the assisting node. If the feedback indicates the UE can use the assisting node, it may also indicate under what conditions. If the feedback indicates the UE cannot use the assisting node, it may also indicate the reason or cause. In some cases, the feedback may be based on some prior coordination between the assisting node and network, based on which the assisting node may be able to decide whether it can serve a new UE or not.

In some cases, the assisting node may have a (UE-like) modem and the capability to connect (establish an RRC connection) to the NW. However, in some cases, the assisting node may not be currently connected.

Figure 11:
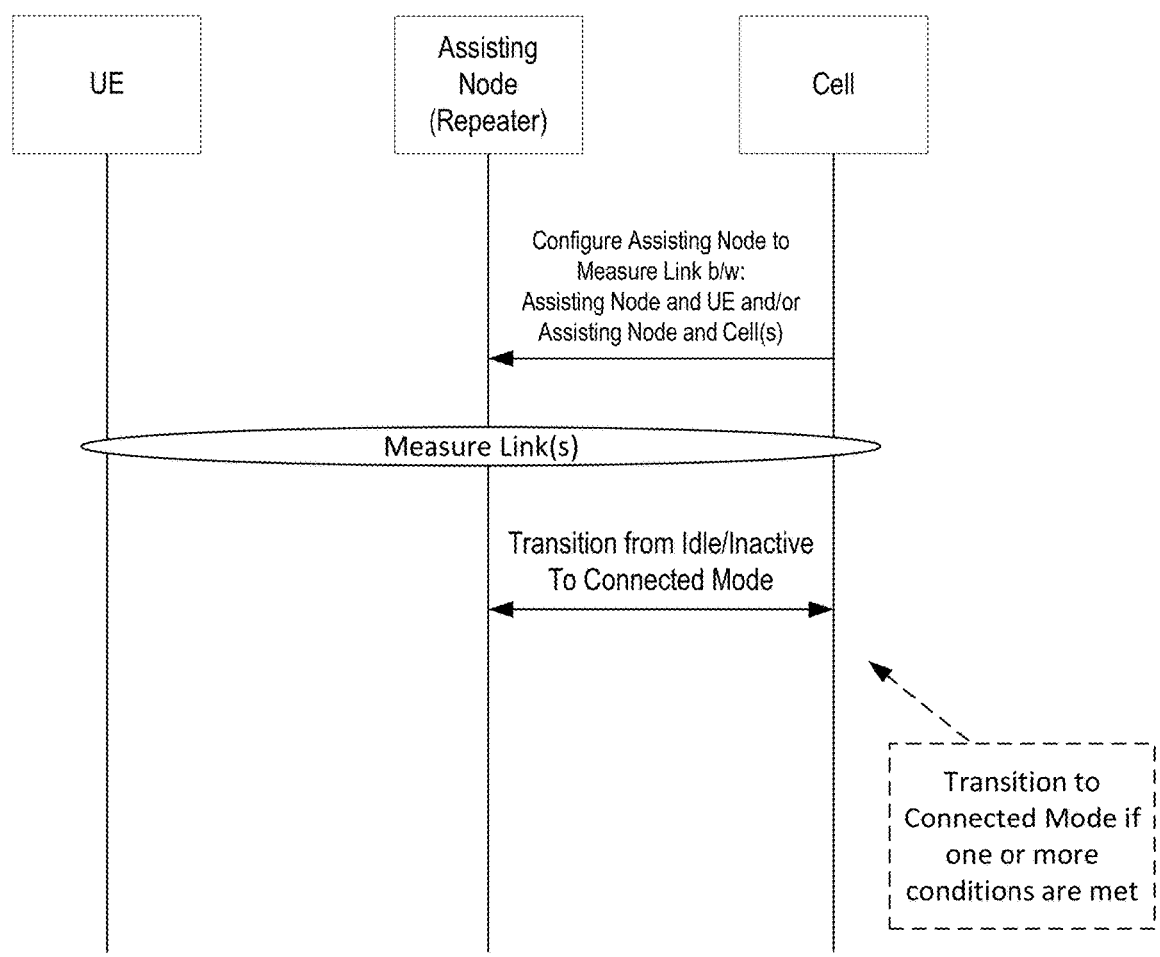
FIG. 11 depicts a call flow diagram for an assisting node to transition to a connected mode, in accordance with aspects of the present disclosure.

For example, as illustrated in the call flow diagram 1100 of FIG. 11, if there is not currently a UE that would need the assisting node's assistance; the assisting node may not need to stay in the connected mode.

As illustrated in FIG. 11, the assisting node may be in idle or inactive mode, and transition to connected mode if one or more conditions are met. For example, the assisting node may transition to connected mode after receiving a request from a UE that would need assistance from assisting node to connect to the network, after detecting presence of UE(s) that may need assistance, or after receiving a paging message from the network.

As noted above, after receiving a request from a UE that would need assistance from assisting node to connect to the network, the assisting node may share information (with the UE) about the cells it can detect or camp on. In some cases, the assisting node may have some rules to decide whether it can (or should) serve the UE. The rules may be preconfigured or indicated by the network. In some cases, the assisting node may attempt to reconnect only if it determines (based on the rules) that it can (or should) serve the UE.

In some cases, the rules may involve thresholds on (UE-R) link measurements between the UE and assisting node. Such measurements may be performed by the assisting node or reported by the UE. In some cases, the rules may involve UE identities, collocation of the UE and assisting node, or a mobility state of the UE. In some cases, the rules may involve different classes/categories of UEs, traffic type of the UE, UE measurements from other cells/assisting nodes, or a number of requesting UEs. In some cases, the rules may involve a capability of the UE (e.g., whether the UE can/cannot support some enhanced features related to controlling the assisting node).

In some cases, the UE may explicitly request a network entity to establish a link (and transition to a connected state) to one the detected cells. For example, the UE may have been indicated (configured and/or authorized) by the network to send such an indication. The UE may also be indicated (or configured) with conditions/rules under which it can send the indication to the network entity.

As noted above, in some cases, an assisting node may detect the presence of one or more UEs that potentially need its assistance. In such cases, detection/measurements may be performed via the local interface (e.g., based on SL signals), or Uu (UL) signals of the UE sent to the network. The assisting node may be configured (e.g., by the network) with resources/configurations to detect/measure UEs and criteria (e.g., thresholds) to decide whether a UE may need assistance and whether the assisting node should become active.

In some cases, an assisting node may be in contact with other assisting nodes in the same vicinity. In such cases, the decision to become a candidate to serve a UE (and transition to a connected mode) may be based on some coordination and information exchanged among the assisting nodes.

In case an assisting node transitions to a connected mode after receiving a paging message from the network, any suitable procedure may be used to page the assisting node and instruct it to become active.

As illustrated in FIG. 11, in some cases, the network may request the assisting node to send a report (status report) of its measurements (or measurements and information received from potential nearby UEs) to the network.

In some cases, to simplify the signaling and reduce the latency, a paging procedure may be optimized for such purposes. For example, a relatively simple indication (such as paging early indication (PEI), or paging PDCCH only) may be used to trigger an assisting node to become active. After receiving this indication, the assisting node may start to forward Uu signals (e.g., using some previously indicated configurations), or may send a report on the preconfigured resources.

In some cases, an assisting node may be configured to send uplink feedback. For example, the assisting node may send uplink feedback in response to a PEI or PDCCH to allow CSI acquisition by the network and for providing an UL grant for the assisting node to send its report. In such cases, the timing may be the assisting node receives a DL PEI, transmits an UL PEI response, receives a PDCCH (providing the UL grant), and sends a PUSCH (including its report).

In some cases, the content of a paging message may provide information an assisting node uses to transition to a connected mode. For example, information carried in a paging PDSCH may provide information or instruction to an assisting node to become active (e.g., to start forwarding on the Uu and/or to send a report).

Example Operations of a User Equipment

Figure 12:
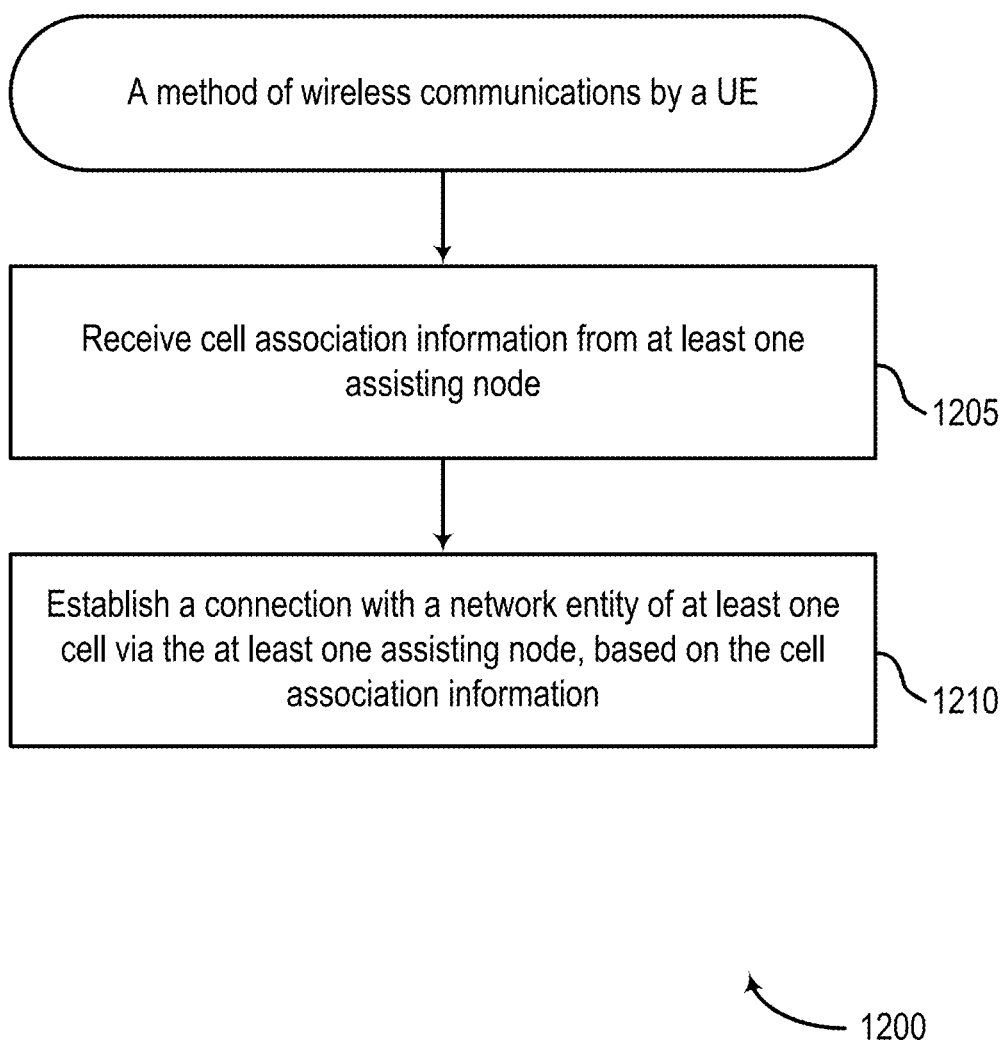
FIG. 12 depicts a method for wireless communications.

FIG. 12 shows an example of a method 1200 of wireless communications by a UE, such as a UE 104 of FIGS. 1 and 3.

Method 1200 begins at step 1205 with receiving cell association information from at least one assisting node. In some cases, the operations of this step refer to, or may be performed by, circuitry for receiving and/or code for receiving as described with reference to FIG. 14.

Method 1200 then proceeds to step 1210 with establishing a connection with a network entity of at least one cell via the at least one assisting node, based on the cell association information. In some cases, the operations of this step refer to, or may be performed by, circuitry for establishing and/or code for establishing as described with reference to FIG. 14.

In some aspects, the cell association information comprises at least one of: one or more cell to which the assisting node is currently connected to or is camping on; SSB beam indices; a quality of a link between the assisting node and a cell; or one or more neighbor cells detected by the assisting node.

In some aspects, establishing the connection comprises: transmitting a report with information regarding a path to the network entity via the assisting node.

In some aspects, the UE and assisting node are connected to a same cell; and the report indicates a beam available to the UE via the assisting node.

In some aspects, the UE is connected to a first cell when it receives the cell association information from at least one assisting node, while the assisting node is connected to a second cell; and the report includes a measurement for the second cell.

In some aspects, the UE is not connected to a cell when it receives the cell association information from at least one assisting node.

In some aspects, the report indicates: an end-to-end quality metric for a path from the network entity to the UE via the assisting node.

In some aspects, the method 1200 further includes calculating the end-to-end quality metric based on the cell association information and measurements taken by the UE for a link between the UE and the assisting node. In some cases, the operations of this step refer to, or may be performed by, circuitry for calculating and/or code for calculating as described with reference to FIG. 14.

In some aspects, the method 1200 further includes including the end-to-end quality metric in the report. In some cases, the operations of this step refer to, or may be performed by, circuitry for including and/or code for including as described with reference to FIG. 14.

In some aspects, the method 1200 further includes including, in the report, an indication the report is associated with a path from the network entity to the UE via the assisting node. In some cases, the operations of this step refer to, or may be performed by, circuitry for including and/or code for including as described with reference to FIG. 14.

In some aspects, the indication comprises an ID of the assisting node.

In some aspects, the method 1200 further includes sending an indication to the assisting node, that indicates the UE intends to use the assisting node to communicate with the network entity. In some cases, the operations of this step refer to, or may be performed by, circuitry for sending and/or code for sending as described with reference to FIG. 14.

In some aspects, the method 1200 further includes receiving feedback indicating whether or not the network entity authorizes use, by the UE, of the assisting node to communicate with the network entity. In some cases, the operations of this step refer to, or may be performed by, circuitry for receiving and/or code for receiving as described with reference to FIG. 14.

In some aspects, the feedback also indicates a cause code if the network entity does not authorize use, by the UE, of the assisting node to communicate with the network entity.

In some aspects, the feedback also indicates one or more use constraints if the network entity does authorize use, by the UE, of the assisting node to communicate with the network entity.

In some aspects, the method 1200 further includes receiving feedback indicating whether or not the assisting node authorizes use, by the UE, of the assisting node to communicate with the network entity. In some cases, the operations of this step refer to, or may be performed by, circuitry for receiving and/or code for receiving as described with reference to FIG. 14.

In some aspects, the feedback also indicates a cause code if the assisting node does not authorize use, by the UE, of the assisting node to communicate with the network entity.

Figure 14:
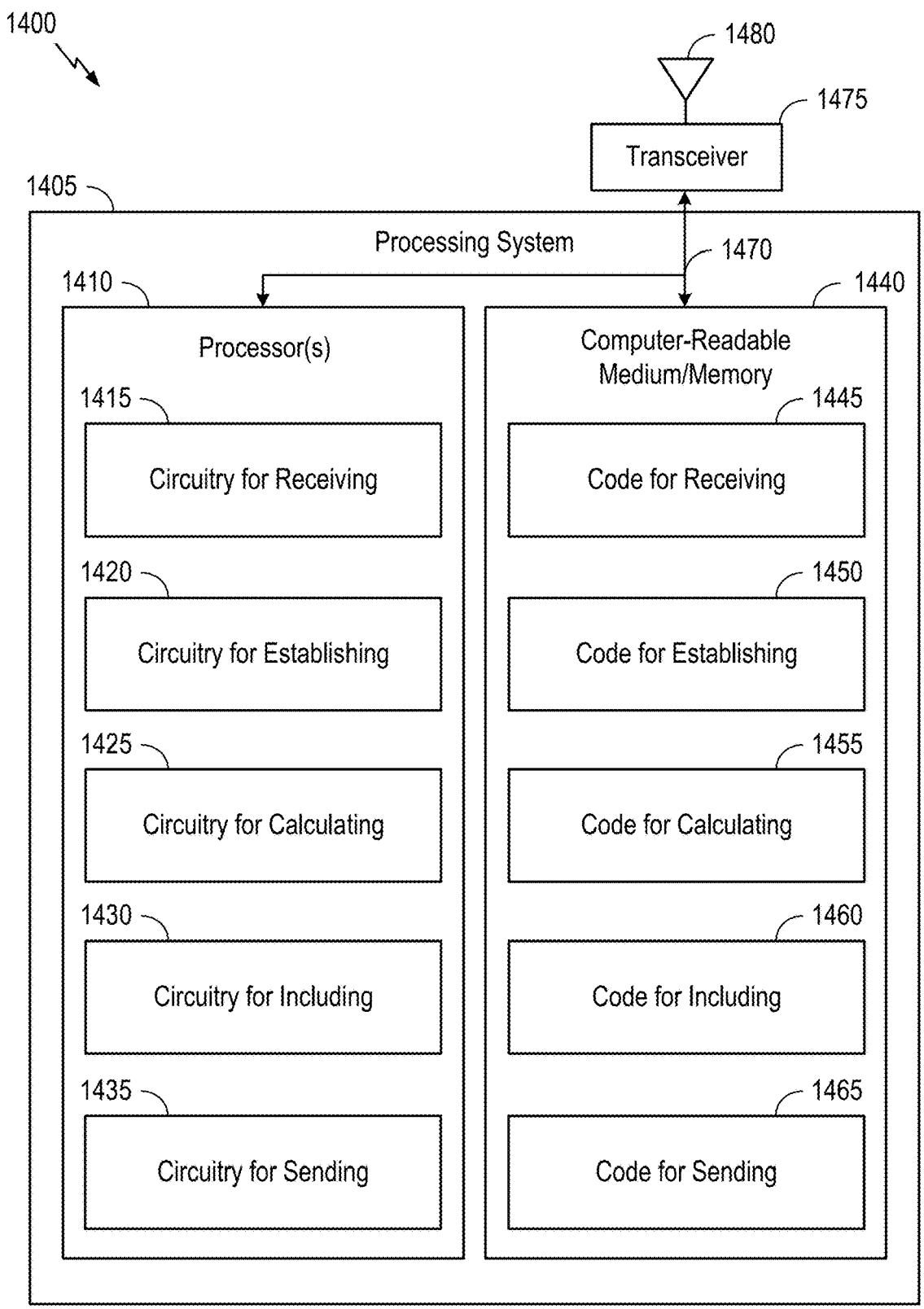
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Operations of an Assisting Node

Figure 13:
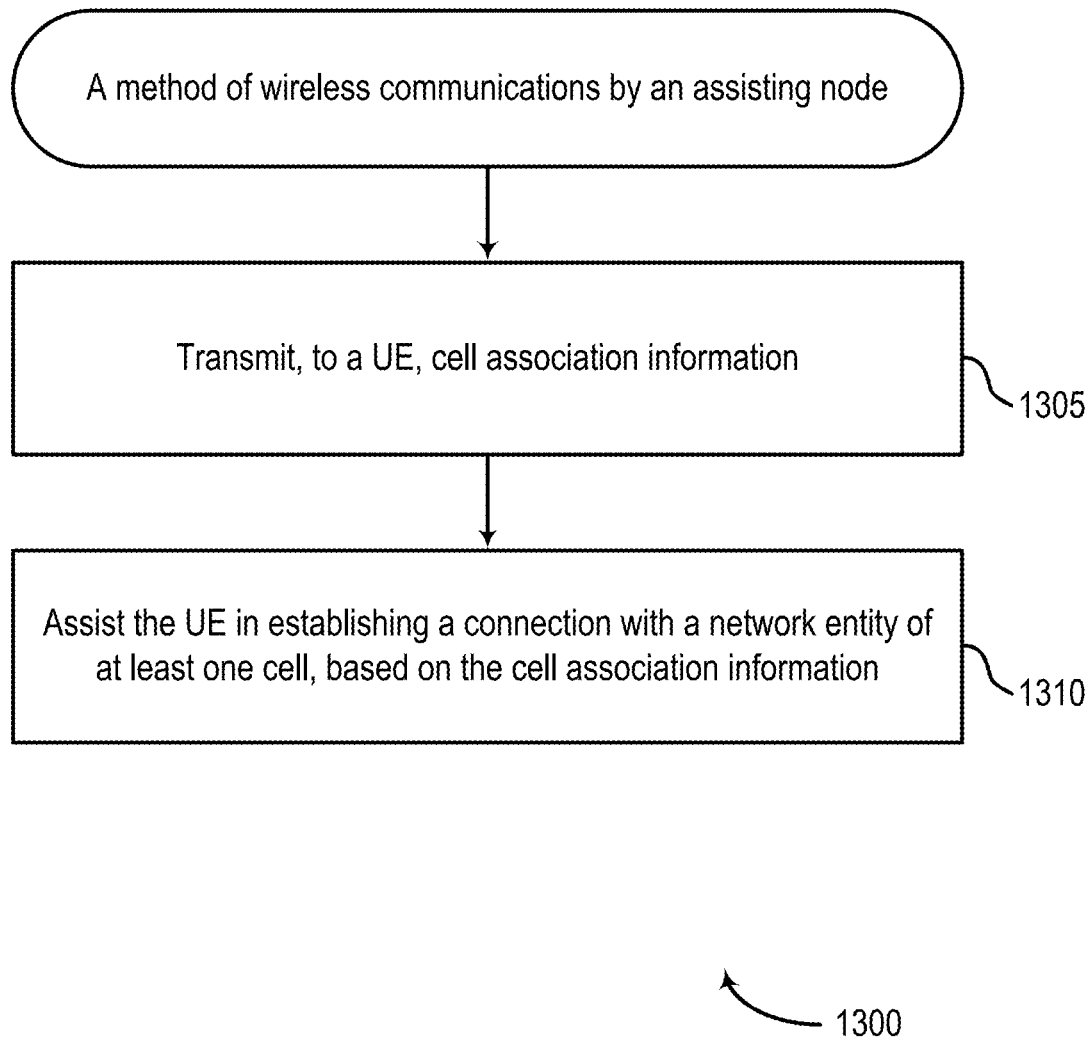
FIG. 13 depicts a method for wireless communications.

FIG. 13 shows an example of a method 1300 of wireless communications by an assisting node. In some aspects, the assisting node is a UE, such as a UE 104 of FIGS. 1 and 3. In some aspects, the assisting node is a network entity, such as a BS 102 of FIGS. 1 and 3, or a disaggregated base station as discussed with respect to FIG. 2.

Method 1300 begins at step 1305 with transmitting, to a UE, cell association information. In some cases, the operations of this step refer to, or may be performed by, circuitry for transmitting and/or code for transmitting as described with reference to FIG. 15.

Method 1300 then proceeds to step 1310 with assisting the UE in establishing a connection with a network entity of at least one cell, based on the cell association information. In some cases, the operations of this step refer to, or may be performed by, circuitry for assisting and/or code for assisting as described with reference to FIG. 15.

In some aspects, the cell association information comprises at least one of: one or more cell to which the assisting node is currently connected to or is camping on; SSB beam indices; a quality of a link between the assisting node and a cell; or one or more neighbor cells detected by the assisting node.

In some aspects, establishing the connection comprises: transmitting a report with information regarding a path from the UE to the network entity, via the assisting node.

In some aspects, the UE and assisting node are connected to a same cell; and the report indicates a beam available to the UE via the assisting node.

In some aspects, the UE is connected to a first cell when it receives the cell association information from at least one assisting node, while the assisting node is connected to a second cell; and the report includes a measurement for the second cell.

In some aspects, the UE is not connected to a cell when it receives the cell association information from at least one assisting node.

In some aspects, the report indicates: an end-to-end quality metric for a path from the network entity to the UE via the assisting node.

In some aspects, the method 1300 further includes assisting the UE in calculating the end-to-end quality metric based on the cell association information and measurements taken by the UE for a link between the UE and the assisting node. In some cases, the operations of this step refer to, or may be performed by, circuitry for assisting and/or code for assisting as described with reference to FIG. 15.

In some aspects, the method 1300 further includes including the end-to-end quality metric in the report. In some cases, the operations of this step refer to, or may be performed by, circuitry for including and/or code for including as described with reference to FIG. 15.

In some aspects, the method 1300 further includes receiving, from the UE, an indication that the UE intends to use the assisting node to communicate with the network entity. In some cases, the operations of this step refer to, or may be performed by, circuitry for receiving and/or code for receiving as described with reference to FIG. 15.

In some aspects, the method 1300 further includes transmitting feedback, to at least one of the network entity or the UE, indicating whether or not the assisting node authorizes use, by the UE, of the assisting node to communicate with the network entity. In some cases, the operations of this step refer to, or may be performed by, circuitry for transmitting and/or code for transmitting as described with reference to FIG. 15.

In some aspects, the feedback also indicates a cause code if the assisting node does not authorize use, by the UE, of the assisting node to communicate with the network entity.

In some aspects, the method 1300 further includes transitioning, from an idle or inactive mode, to a connected mode with the network entity if one or more conditions are met. In some cases, the operations of this step refer to, or may be performed by, circuitry for transitioning and/or code for transitioning as described with reference to FIG. 15.

In some aspects, the one or more conditions comprise at least one of: receiving a request from the UE that the UE intends to connect to the network entity with assistance from the assisting node; or the assisting node detecting at least one UE that could connect to the network entity with assistance from the assisting node.

In some aspects, the request indicates the UE is authorized to connect to the network entity with assistance from the assisting node.

In some aspects, the assisting node transitions to the connected mode if one or more rules indicate the assisting node can assist the UE in communicating with the network entity.

In some aspects, the one or more rules involve at least one of: measurements on a link between the UE and assisting node; an identity of the UE; relative location of the UE and assisting node; a mobility state, class, category, or traffic type of the UE; measurements on a link between the UE one or more other assisting nodes or cells; and a number of UEs or capability of UEs request assistance.

In some aspects, the method 1300 further includes receiving information configuring the assisting node to take measurements on at least one of: a link between one or more UEs and the assisting node, or a link between a network entity of one or more cells and the assisting node; and deciding whether to transition to a connected mode based on the measurements. In some cases, the operations of this step refer to, or may be performed by, circuitry for receiving and/or code for receiving as described with reference to FIG. 15.

In some aspects, the method 1300 further includes receiving a request from a network entity for a report including at least some of the measurements taken by the assisting node. In some cases, the operations of this step refer to, or may be performed by, circuitry for receiving and/or code for receiving as described with reference to FIG. 15.

In some aspects, the request is indicated via a paging message or a PEI.

Figure 15:
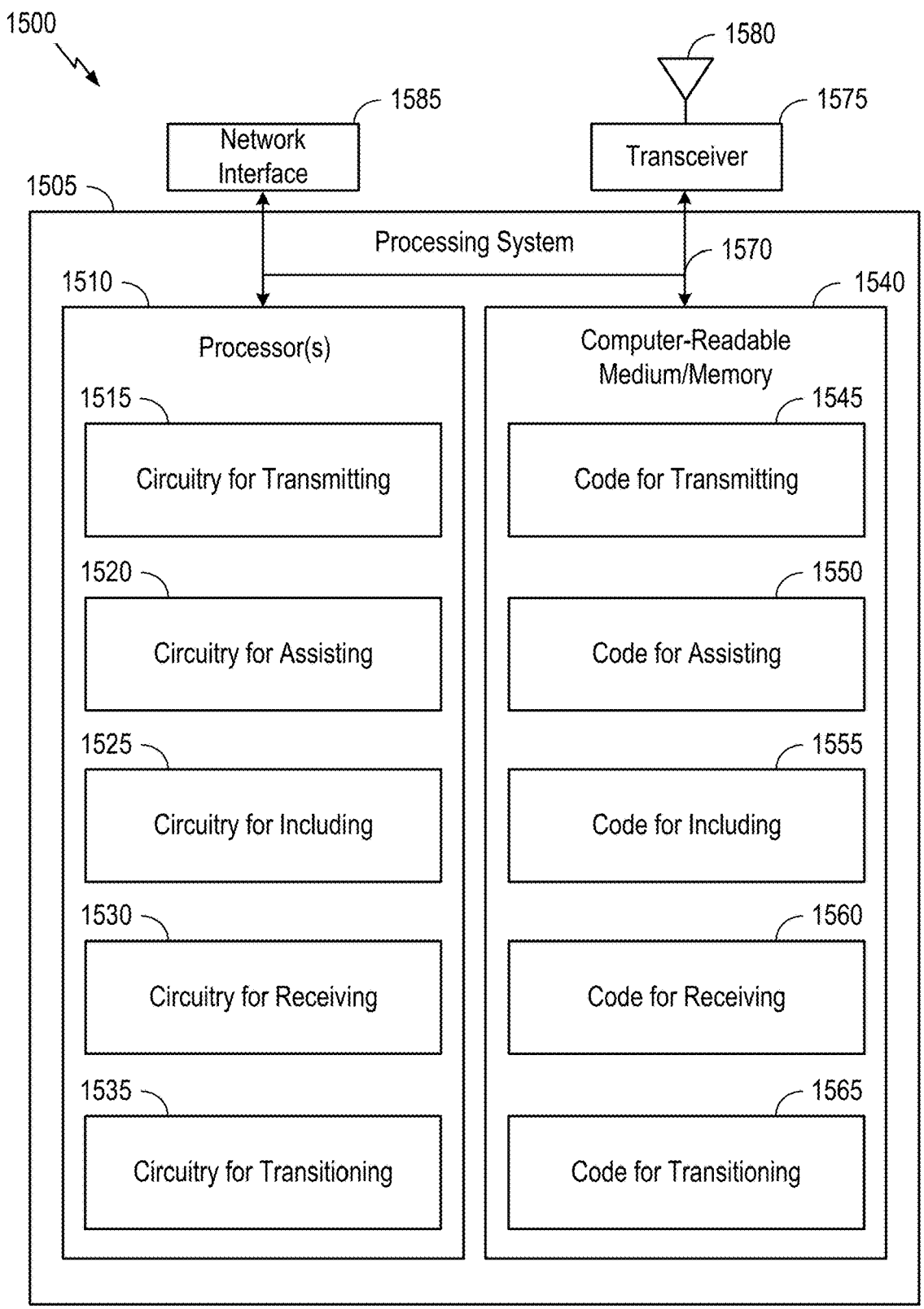
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Example Communications Devices

FIG. 14 depicts aspects of an example communications device 1400. In some aspects, communications device 1400 is a user equipment, such as UE 104 described above with respect to FIGS. 1 and 3.

The communications device 1400 includes a processing system 1405 coupled to the transceiver 1475 (e.g., a transmitter and/or a receiver). The transceiver 1475 is configured to transmit and receive signals for the communications device 1400 via the antenna 1480, such as the various signals as described herein. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of receive processor 358, transmit processor 364, TX MIMO processor 366, and/or controller/processor 380, as described with respect to FIG. 3. The one or more processors 1410 are coupled to a computer-readable medium/memory 1440 via a bus 1470. In certain aspects, the computer-readable medium/memory 1440 is configured to store instructions (e.g., computer-executable code) that when executed by the one or more processors 1410, cause the one or more processors 1410 to perform the method 1200 described with respect to FIG. 12, or any aspect related to it. Note that reference to a processor performing a function of communications device 1400 may include one or more processors 1410 performing that function of communications device 1400.

In the depicted example, computer-readable medium/memory 1440 stores code (e.g., executable instructions), such as code for receiving 1445, code for establishing 1450, code for calculating 1455, code for including 1460, and code for sending 1465. Processing of the code for receiving 1445, code for establishing 1450, code for calculating 1455, code for including 1460, and code for sending 1465 may cause the communications device 1400 to perform the method 1200 described with respect to FIG. 12, or any aspect related to it.

The one or more processors 1410 include circuitry configured to implement (e.g., execute) the code stored in the computer-readable medium/memory 1440, including circuitry such as circuitry for receiving 1415, circuitry for establishing 1420, circuitry for calculating 1425, circuitry for including 1430, and circuitry for sending 1435. Processing with circuitry for receiving 1415, circuitry for establishing 1420, circuitry for calculating 1425, circuitry for including 1430, and circuitry for sending 1435 may cause the communications device 1400 to perform the method 1200 described with respect to FIG. 12, or any aspect related to it.

Various components of the communications device 1400 may provide means for performing the method 1200 described with respect to FIG. 12, or any aspect related to it. For example, means for transmitting, sending or outputting for transmission may include transceivers 354 and/or antenna(s) 352 of the UE 104 illustrated in FIG. 3 and/or the transceiver 1475 and the antenna 1480 of the communications device 1400 in FIG. 14. Means for receiving or obtaining may include transceivers 354 and/or antenna(s) 352 of the UE 104 illustrated in FIG. 3 and/or the transceiver 1475 and the antenna 1480 of the communications device 1400 in FIG. 14.

FIG. 15 depicts aspects of an example communications device 1500. In some aspects, communications device 1500 is an assisting node, and the assisting node may include a user equipment, such as UE 104 described above with respect to FIGS. 1 and 3. In some aspects, communications device 1500 is an assisting node, and the assisting node may include a network entity, such as a BS 102 of FIGS. 1 and 3, or a disaggregated base station as discussed with respect to FIG. 2.

The communications device 1500 includes a processing system 1505 coupled to the transceiver 1575 (e.g., a transmitter and/or a receiver). In some aspects (e.g., when communications device 1500 is a network entity), processing system 1505 may be coupled to a network interface 1585 that is configured to obtain and send signals for the communications device 1500 via communication link(s), such as a backhaul link, midhaul link, and/or fronthaul link as described herein, such as with respect to FIG. 2. The transceiver 1575 is configured to transmit and receive signals for the communications device 1500 via the antenna 1580, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. In various aspects, one or more processors 1510 may be representative of one or more of receive processor 338, transmit processor 320, TX MIMO processor 330, and/or controller/processor 340, as described with respect to FIG. 3. The one or more processors 1510 are coupled to a computer-readable medium/memory 1540 via a bus 1570. In certain aspects, the computer-readable medium/memory 1540 is configured to store instructions (e.g., computer-executable code) that when executed by the one or more processors 1510, cause the one or more processors 1510 to perform the method 1300 described with respect to FIG. 13, or any aspect related to it. Note that reference to a processor performing a function of communications device 1500 may include one or more processors 1510 performing that function of communications device 1500.

In the depicted example, computer-readable medium/memory 1540 stores code (e.g., executable instructions), such as code for transmitting 1545, code for assisting 1550, code for including 1555, code for receiving 1560, and code for transitioning 1565. Processing of the code for transmitting 1545, code for assisting 1550, code for including 1555, code for receiving 1560, and code for transitioning 1565 may cause the communications device 1500 to perform the method 1300 described with respect to FIG. 13, or any aspect related to it.

The one or more processors 1510 include circuitry configured to implement (e.g., execute) the code stored in the computer-readable medium/memory 1540, including circuitry such as circuitry for transmitting 1515, circuitry for assisting 1520, circuitry for including 1525, circuitry for receiving 1530, and circuitry for transitioning 1535. Processing with circuitry for transmitting 1515, circuitry for assisting 1520, circuitry for including 1525, circuitry for receiving 1530, and circuitry for transitioning 1535 may cause the communications device 1500 to perform the method 1300 described with respect to FIG. 13, or any aspect related to it.

Various components of the communications device 1500 may provide means for performing the method 1300 described with respect to FIG. 13, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1575 and the antenna 1580 of the communications device 1500 in FIG. 15. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1575 and the antenna 1580 of the communications device 1500 in FIG. 15.

Example Clauses

Implementation examples are described in the following numbered clauses:

Clause 1: A method of wireless communications by a UE, comprising: receiving cell association information from at least one assisting node; and establishing a connection with a network entity of at least one cell via the at least one assisting node, based on the cell association information.

Clause 2: The method of Clause 1, wherein the cell association information comprises at least one of: one or more cell to which the assisting node is currently connected to or is camping on; SSB beam indices; a quality of a link between the assisting node and a cell; or one or more neighbor cells detected by the assisting node.

Clause 3: The method of any one of Clauses 1 and 2, wherein establishing the connection comprises: transmitting a report with information regarding a path to the network entity via the assisting node.

Clause 4: The method of Clause 3, wherein: the UE and assisting node are connected to a same cell; and the report indicates a beam available to the UE via the assisting node.

Clause 5: The method of Clause 3, wherein: the UE is connected to a first cell when it receives the cell association information from at least one assisting node, while the assisting node is connected to a second cell; and the report includes a measurement for the second cell.

Clause 6: The method of Clause 3, wherein the UE is not connected to a cell when it receives the cell association information from at least one assisting node.

Clause 7: The method of Clause 3, wherein the report indicates: an end-to-end quality metric for a path from the network entity to the UE via the assisting node.

Clause 8: The method of Clause 7, further comprising: calculating the end-to-end quality metric based on the cell association information and measurements taken by the UE for a link between the UE and the assisting node; and including the end-to-end quality metric in the report.

Clause 9: The method of Clause 3, further comprising: including, in the report, an indication the report is associated with a path from the network entity to the UE via the assisting node.

Clause 10: The method of Clause 9, wherein the indication comprises an ID of the assisting node.

Clause 11: The method of Clause 9, further comprising: sending an indication to the assisting node, that indicates the UE intends to use the assisting node to communicate with the network entity.

Clause 12: The method of Clause 3, further comprising: receiving feedback indicating whether or not the network entity authorizes use, by the UE, of the assisting node to communicate with the network entity.

Clause 13: The method of Clause 12, wherein the feedback also indicates a cause code if the network entity does not authorize use, by the UE, of the assisting node to communicate with the network entity.

Clause 14: The method of Clause 12, wherein the feedback also indicates one or more use constraints if the network entity does authorize use, by the UE, of the assisting node to communicate with the network entity.

Clause 15: The method of Clause 3, further comprising: receiving feedback indicating whether or not the assisting node authorizes use, by the UE, of the assisting node to communicate with the network entity.

Clause 16: The method of Clause 15, wherein the feedback also indicates a cause code if the assisting node does not authorize use, by the UE, of the assisting node to communicate with the network entity.

Clause 17: A method of wireless communications by an assisting node, comprising: transmitting, to a UE, cell association information; and assisting the UE establish a connection with a network entity of at least one cell, based on the cell association information.

Clause 18: The method of Clause 17, wherein the cell association information comprises at least one of: one or more cell to which the assisting node is currently connected to or is camping on; SSB beam indices; a quality of a link between the assisting node and a cell; or one or more neighbor cells detected by the assisting node.

Clause 19: The method of any one of Clauses 17 and 18, wherein establishing the connection comprises: transmitting a report with information regarding a path from the UE to the network entity, via the assisting node.

Clause 20: The method of Clause 19, wherein: the UE and assisting node are connected to a same cell; and the report indicates a beam available to the UE via the assisting node.

Clause 21: The method of Clause 19, wherein: the UE is connected to a first cell when it receives the cell association information from at least one assisting node, while the assisting node is connected to a second cell; and the report includes a measurement for the second cell.

Clause 22: The method of Clause 19, wherein the UE is not connected to a cell when it receives the cell association information from at least one assisting node.

Clause 23: The method of Clause 19, wherein the report indicates: an end-to-end quality metric for a path from the network entity to the UE via the assisting node.

Clause 24: The method of Clause 23, further comprising: assisting the UE in calculating the end-to-end quality metric based on the cell association information and measurements taken by the UE for a link between the UE and the assisting node; and including the end-to-end quality metric in the report.

Clause 25: The method of Clause 19, further comprising: receiving, from the UE, an indication that the UE intends to use the assisting node to communicate with the network entity.

Clause 26: The method of Clause 19, further comprising: transmitting feedback, to at least one of the network entity or the UE, indicating whether or not the assisting node authorizes use, by the UE, of the assisting node to communicate with the network entity.

Clause 27: The method of Clause 26, wherein the feedback also indicates a cause code if the assisting node does not authorize use, by the UE, of the assisting node to communicate with the network entity.

Clause 28: The method of any one of Clauses 17-27, further comprising: transitioning, from an idle or inactive mode, to a connected mode with the network entity if one or more conditions are met.

Clause 29: The method of Clause 28, wherein the one or more conditions comprise at least one of: receiving a request from the UE that the UE intends to connect to the network entity with assistance from the assisting node; or the assisting node detecting at least one UE that could connect to the network entity with assistance from the assisting node.

Clause 30: The method of Clause 29, wherein the request indicates the UE is authorized to connect to the network entity with assistance from the assisting node.

Clause 31: The method of Clause 28, wherein the assisting node transitions to the connected mode if one or more rules indicate the assisting node can assist the UE in communicating with the network entity.

Clause 32: The method of Clause 31, wherein the one or more rules involve at least one of: measurements on a link between the UE and assisting node; an identity of the UE; relative location of the UE and assisting node; a mobility state, class, category, or traffic type of the UE; measurements on a link between the UE one or more other assisting nodes or cells; and a number of UEs or capability of UEs request assistance.

Clause 33: The method of Clause 28, further comprising: receiving information configuring the assisting node to take measurements on at least one of: a link between one or more UEs and the assisting node, or a link between a network entity of one or more cells and the assisting node; and deciding whether to transition to a connected mode based on the measurements.

Clause 34: The method of Clause 33, further comprising: receiving a request from a network entity for a report including at least some of the measurements taken by the assisting node.

Clause 35: The method of Clause 34, wherein the request is indicated via a paging message or a PEI.

Clause 36: An apparatus, comprising: a memory comprising executable instructions; and a processor configured to execute the executable instructions and cause the apparatus to perform a method in accordance with any one of Clauses 1-35.

Clause 37: An apparatus, comprising means for performing a method in accordance with any one of Clauses 1-35.

Clause 38: A non-transitory computer-readable medium comprising executable instructions that, when executed by a processor of an apparatus, cause the apparatus to perform a method in accordance with any one of Clauses 1-35.

Clause 39: A computer program product embodied on a computer-readable storage medium comprising code for performing a method in accordance with any one of Clauses 1-35.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communications by a user equipment (UE), comprising:
   receiving cell association information from at least one assisting node; and
   establishing a connection with a network entity of at least one cell via the at least one assisting node, based on the cell association information, where establishing the connection comprises transmitting a report with information regarding a path to the network entity via the assisting node and the report includes an indication the report is associated with a path from the network entity to the UE via the assisting node.

2. The method of claim 1, wherein the cell association information comprises at least one of:
one or more cell to which the assisting node is currently connected to or is camping on;
synchronization signal block (SSB) beam indices;
a quality of a link between the assisting node and a cell; or
one or more neighbor cells detected by the assisting node.

3. The method of claim 1, wherein:
the UE and assisting node are connected to a same cell; and
the report indicates a beam available to the UE via the assisting node.

4. The method of claim 1, wherein:
the UE is connected to a first cell when it receives the cell association information from at least one assisting node, while the assisting node is connected to a second cell; and
the report includes a measurement for the second cell.

5. The method of claim 1, wherein the UE is not connected to a cell when it receives the cell association information from at least one assisting node.

6. The method of claim 1, wherein the report indicates:
an end-to-end quality metric for a path from the network entity to the UE via the assisting node.

7. The method of claim 6, further comprising:
calculating the end-to-end quality metric based on the cell association information and measurements taken by the UE for a link between the UE and the assisting node; and
including the end-to-end quality metric in the report.

8. The method of claim 1, wherein the indication comprises an identifier (ID) of the assisting node.

9. The method of claim 1, further comprising sending an indication to the assisting node, that indicates the UE intends to use the assisting node to communicate with the network entity.

10. The method of claim 1, further comprising:
receiving feedback indicating whether or not the network entity authorizes use, by the UE, of the assisting node to communicate with the network entity.

11. The method of claim 10, wherein the feedback also indicates a cause code if the network entity does not authorize use, by the UE, of the assisting node to communicate with the network entity.

12. The method of claim 10, wherein the feedback also indicates one or more use constraints if the network entity does authorize use, by the UE, of the assisting node to communicate with the network entity.

13. The method of claim 1, further comprising:
receiving feedback indicating whether or not the assisting node authorizes use, by the UE, of the assisting node to communicate with the network entity.

14. The method of claim 13, wherein the feedback also indicates a cause code if the assisting node does not authorize use, by the UE, of the assisting node to communicate with the network entity.

15. A method of wireless communications by an assisting node, comprising:
transmitting, to a user equipment (UE), cell association information; and
assisting the UE establish a connection with a network entity of at least one cell, based on the cell association information; and
transitioning, from an idle or inactive mode, to a connected mode with the network entity if one or more conditions are met.

16. The method of claim 15, wherein the cell association information comprises at least one of:
one or more cell to which the assisting node is currently connected to or is camping on;
synchronization signal block (SSB) beam indices;
a quality of a link between the assisting node and a cell; or
one or more neighbor cells detected by the assisting node.

17. The method of claim 15, wherein establishing the connection comprises:
transmitting a report with information regarding a path from the UE to the network entity, via the assisting node.

18. The method of claim 17, wherein:
the UE and assisting node are connected to a same cell; and
the report indicates a beam available to the UE via the assisting node.

19. The method of claim 17, wherein:
the UE is connected to a first cell when it receives the cell association information from at least one assisting node, while the assisting node is connected to a second cell; and
the report includes a measurement for the second cell.

20. The method of claim 17, wherein the UE is not connected to a cell when it receives the cell association information from at least one assisting node.

21. The method of claim 17, wherein the report indicates:
an end-to-end quality metric for a path from the network entity to the UE via the assisting node.

22. The method of claim 21, further comprising:
assisting the UE in calculating the end-to-end quality metric based on the cell association information and measurements taken by the UE for a link between the UE and the assisting node; and
including the end-to-end quality metric in the report.

23. The method of claim 17, further comprising receiving, from the UE, an indication that the UE intends to use the assisting node to communicate with the network entity.

24. The method of claim 17, further comprising:
transmitting feedback, to at least one of the network entity or the UE, indicating whether or not the assisting node authorizes use, by the UE, of the assisting node to communicate with the network entity.

25. The method of claim 24, wherein the feedback also indicates a cause code if the assisting node does not authorize use, by the UE, of the assisting node to communicate with the network entity.

26. A user equipment (UE) configured for wireless communication, comprising: a memory comprising processor-executable instructions; and one or more processors configured to execute the processor-executable instructions and cause the UE to:
receive cell association information from at least one assisting node; and
establish a connection with a network entity of at least one cell via the at least one assisting node, based on the cell association information, where to establish the connection comprises transmitting a report with information regarding a path to the network entity via the assisting node and the report includes an indication the report is associated with a path from the network entity to the UE via the assisting node.

27. An assisting node configured for wireless communication, comprising: a memory comprising processor-executable instructions; and one or more processors configured to execute the processor-executable instructions and cause the assisting node to:
- transmit, to a user equipment (UE), cell association information;
- assist the UE in establishing a connection with a network entity of at least one cell, based on the cell association information; and
- transition, from an idle or inactive mode, to a connected mode with the network entity if one or more conditions are met.

* * * * *